United States Patent
Wang et al.

(10) Patent No.: US 6,435,944 B1
(45) Date of Patent: Aug. 20, 2002

(54) CMP SLURRY FOR PLANARIZING METALS

(75) Inventors: Yuchun Wang, Cupertino; Rajeev Bajaj; Fred C. Redeker, both of Fremont, all of CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/428,304

(22) Filed: Oct. 27, 1999

(51) Int. Cl.[7] .................................................. B24B 1/00
(52) U.S. Cl. ........................ 451/41; 451/60; 451/446; 51/309; 106/3; 438/692; 438/693; 252/79.2
(58) Field of Search ............... 451/60, 446; 51/309; 106/3; 438/692, 693; 252/79.2

(56) References Cited

U.S. PATENT DOCUMENTS

| | | | |
|---|---|---|---|
| 4,789,648 A | * 12/1988 | Chow et al. | 437/225 |
| 4,867,757 A | 9/1989 | Payne | |
| 5,014,468 A | 5/1991 | Ravipati et al. | |
| 5,209,816 A | * 5/1993 | Yu et al. | 156/636 |
| 5,340,370 A | * 8/1994 | Cadien et al. | 51/308 |
| 5,453,312 A | 9/1995 | Haas et al. | |
| 5,454,844 A | 10/1995 | Hibbard et al. | |
| 5,692,950 A | 12/1997 | Rutherford et al. | |
| 5,693,563 A | 12/1997 | Teong | |
| 5,756,398 A | 5/1998 | Wang et al. | |
| 5,783,489 A | 7/1998 | Kaufman et al. | |
| 5,820,450 A | 10/1998 | Calhoun | |
| 5,842,910 A | 12/1998 | Krywanczyk et al. | |
| 5,866,031 A | 2/1999 | Carpio et al. | |
| 5,932,486 A | 8/1999 | Cook et al. | |
| 5,954,997 A | 9/1999 | Kaufman et al. | |
| 6,008,405 A | 12/1999 | Gray et al. | |
| 6,030,899 A | 2/2000 | Cook et al. | |
| 6,046,110 A | 4/2000 | Hirabayashi et al. | |
| 6,063,306 A | 5/2000 | Kaufman et al. | |
| 6,068,879 A | 5/2000 | Pasch | |
| 6,074,949 A | 6/2000 | Schonauer et al. | |
| 6,083,840 A | 7/2000 | Mravic et al. | |
| 6,096,652 A | 8/2000 | Watts et al. | |
| 6,117,775 A | 9/2000 | Kondo et al. | |
| 6,117,783 A | 9/2000 | Small et al | |
| 6,126,853 A | 10/2000 | Kaufman et al. | |
| 6,210,525 B1 | 4/2001 | James et al. | |
| 6,217,416 B1 | 4/2001 | Kaufman et al. | |
| 6,245,679 B1 | 6/2001 | Cook et al. | |
| 2001/0036798 A1 | 11/2001 | Oliver | |

FOREIGN PATENT DOCUMENTS

| | | | |
|---|---|---|---|
| EP | 0659858 A2 | 12/1994 | |
| EP | 0659858 A3 | 12/1994 | |
| EP | 0 846 742 A2 | 6/1998 | ............ C09G/1/02 |
| EP | 0 846 742 | 6/1998 | |
| EP | 846 742 A2 | 6/1998 | |
| EP | 0 846 742 A * | 10/1998 | ............ C09G/1/02 |
| EP | 0 896 042 | 2/1999 | |
| WO | WO 98/49723 | 4/1998 | |
| WO | WO 99/53532 | 10/1999 | |
| WO | WO 99/61540 | 12/1999 | |
| WO | WO/00/00561 | 1/2000 | |
| WO | WO 00/00561 | 1/2000 | |
| WO | WO 00/00567 | 1/2000 | |
| WO | WO 01/12739 | 2/2001 | |

OTHER PUBLICATIONS

USSN 09/692,723, filed Oct. 19, 2000.
European Search Report from EP 00 30 8511, Dated Oct. 2, 2001.
Austrian Search Report from 200006115–0, Dated Sep. 17, 2001.

* cited by examiner

*Primary Examiner*—Joseph J. Hail, III
*Assistant Examiner*—Shantese McDonald
(74) *Attorney, Agent, or Firm*—Moser, Patterson & Sheridan

(57) ABSTRACT

A CMP slurry is formulated with a single component oxidizer capable of oxidizing a metal undergoing planarization and yielding a complexing agent which complexes with the oxidized metal thereby minimizing overetching. Embodiments include CMP Cu with a fixed abrasive pad or an abrasive containing slurry, employing a peroxy acid, e.g., peroxy benzoic acid, or a polyethylene glycol peroxy acid. In another embodiment, a single component is employed which dissociates in the slurry into an oxidizer and complexing agent, such as an amine-peroxy acid, e.g., urea peroxy acid.

44 Claims, No Drawings

CMP SLURRY FOR PLANARIZING METALS

TECHNICAL FIELD

The present invention relates to a slurry for planarizing metals by chemical-mechanical polishing (CMP) with improved planarity. The present invention is applicable to manufacturing high speed integrated circuits having submicron design features and high conductivity interconnect structures with high production throughput.

BACKGROUND ART

The escalating requirements for high density and performance associated with ultra large scale integration semiconductor wiring require responsive changes in interconnection technology. Such escalating requirements have been found difficult to satisfy in terms of providing a low RC (resistance and capacitance) interconnect pattern, particularly wherein submicron vias, contacts and trenches have high aspect ratios imposed by miniaturization.

Conventional semiconductor devices comprise a semiconductor substrate, typically doped monocrystalline silicon, and a plurality of sequentially formed dielectric interlayers and conductive patterns. An integrated circuit is formed containing a plurality of conductive patterns comprising conductive lines separated by interwiring spacings, and a plurality of interconnect lines, such as bus lines, bit lines, word lines and logic interconnect lines. Typically, the conductive patterns on different layers, i.e., upper and lower layers, are electrically connected by a conductive plug filling a via hole, while a conductive plug filling a contact hole establishes electrical contact with an active region on a semiconductor substrate, such as a source/drain region. Conductive lines are formed in trenches which typically extend substantially horizontal with respect to the semiconductor substrate. Semiconductor "chips" comprising five or more levels of metallization are becoming more prevalent as device geometries shrink to submicron levels.

A conductive plug filling a via hole is typically formed by depositing an interlayer dielectric on a conductive layer comprising at least one conductive pattern, forming an opening through the interlayer dielectric by conventional photolithographic and etching techniques, and filling the opening with a conductive material, such as tungsten (W). Excess conductive material on the surface of the dielectric interlayer is typically removed by CMP. One such method is known as damascene and basically involves forming an opening in the interlayer dielectric and filling the opening with a metal. Dual damascene techniques involve forming an opening comprising a lower contact or via hole section in communication with an upper trench section. The entire opening is filled with a conductive material, typically a metal, to simultaneously form a conductive plug in electrical contact with a conductive line.

Cu and Cu alloys have received considerable attention as a candidate for replacing Al in interconnect metallizations. Cu has improved electrical properties vis-à-vis W, making Cu a desirable metal for use as a conductive plug as well as conductive wiring.

An approach to forming Cu plugs and wiring comprises the use of damascene structures employing CMP, as in Teong, U.S. Pat. No. 5,693,563. However, due to Cu diffusion through interdielectric layer materials, such as silicon dioxide, Cu interconnect structures must be encapsulated by a diffusion barrier layer. Typical diffusion barrier metals include tantalum (Ta), tantalum nitride (TaN), titanium nitride (TiN), titanium-tungsten (TiW), tungsten (W), tungsten nitride (WN), titanium-titanium nitride (Ti—TiN), titanium silicon nitride (TiSiN), tungsten silicon nitride (WSiN), tantalum silicon nitride (TaSiN), and silicon nitride (SiN), for encapsulating Cu. The use of such barrier materials to encapsulate Cu is not limited to the interface between Cu and the dielectric interlayer, but includes interfaces with other metals as well.

In conventional CMP techniques, a wafer carrier assembly is rotated in contact with a polishing pad which is mounted on a CMP apparatus. The polishing pad is mounted on a rotating turntable or platen driven by an external driving force. The wafers are typically mounted on a carrier or polishing head which provides a controllable force, i.e., pressure, urging the wafers against the rotating polishing pad. Thus, the CMP apparatus effects polishing or rubbing movement between the surface of each thin semiconductor wafer and the polishing pad while dispersing a polishing slurry containing abrasive particles in a reactive solution to effect both chemical activity and mechanical activity while applying a force between the wafer and a polishing pad.

Conventional polishing pads employed in abrasive slurry processing typically comprise a grooved porous polymeric surface, such as polyurethane, and the abrasive slurry varied in accordance with the particular material undergoing CMP. Basically, the abrasive slurry is impregnated into the pores of the polymeric surface while the grooves convey the abrasive slurry to the wafer undergoing CMP. A polishing pad for use in CMP slurry processing is disclosed by Krywanczyk et al. in U.S. Pat. No. 5,842,910. Typical CMP is performed not only on a silicon wafer itself, but on various dielectric layers, such as silicon oxide, conductive layers, such as aluminum and copper, or a layer containing both conductive and dielectric materials as in damascene processing.

A distinctly different type of abrasive article from the above-mentioned abrasive slurry-type polishing pad is a fixed abrasive article, e.g., fixed abrasive polishing pad. Such a fixed abrasive article typically comprises a backing sheet with a plurality of geometric abrasive composite elements adhered thereto. The abrasive particles in a binder, e.g., a polymeric binder. During CMP employing a fixed abrasive article, the substrate or wafer undergoing CMP wears away the fixed abrasive elements thereby releasing the abrasive particles. Accordingly, during CMP employing a fixed abrasive article, a chemical agent is dispersed to provide the chemical activity, while the mechanical activity is provided by the fixed abrasive elements and abrasive particles released therefrom by abrasion with the substrate undergoing CMP. Thus, such fixed abrasive articles do not require the use of a slurry containing loose abrasive particles and advantageously reduce effluent treatment and dishing as compared to polishing pads that require an abrasive slurry. During CMP employing a fixed abrasive polishing pad, a chemical agent is applied to the pad, the agent depending upon the particular material or materials undergoing CMP. However, the chemical agent does not contain abrasive particles as in abrasive slurry-type CMP operations. Fixed abrasive articles are disclosed by Rugherford et al. in U.S. Pat. No. 5,692,950, Calhoun in U.S. Pat. No. 5,820,450, Haas et al. in U.S. Pat. No. 5,453,312 and Hibbard et al. in U.S. Pat. No. 5,454,844.

Fixed abrasive elements of conventional slurry-less type polishing pads are typically formed in various "positive" geometric configurations, such as a cylindrical, cubical, truncated cylindrical, and truncated pyramidal shapes, as disclosed by Calhoun in U.S. Pat. No. 5,820,450. Conventional fixed abrasive articles also comprise "negative" abrasive elements, such as disclosed by Ravipati et al. in U.S. Pat. No. 5,014,468.

In applying conventional planarization techniques, such as CMP, to Cu, it is extremely difficult to achieve a high degree surface uniformity, particularly across a surface extending from a dense array of Cu features, e.g., Cu lines, bordered by an open field. A dense array of metal (Cu) features is typically formed in an interlayer dielectric, such as a silicon oxide layer, by a damascene technique wherein trenches are initially formed. A barrier layer, such as a Ta-containing layer e.g., Ta, TaN, is then deposited lining the trenches and on the upper surface of the silicon oxide interlayer dielectric. Cu or a Cu alloy is then deposited, as by electroplating, electroless plating, physical vapor deposition (PVD) at a temperature of about 50° C. to about 150° C. or chemical vapor deposition (CVD) at a temperature under about 200° C., typically at a thickness of about 8,000 A to about 18,000 A. In planarizing the wafer surface after copper metallization, erosion and dishing are typically encountered, thereby decreasing the degree of surface uniformity or planarity and challenging the depth of focus limitations of conventional photolitographic techniques, particular with respect to achieving submicron dimensions, such as below about 0.25 micron.

Conventional techniques for CMP Cu and Cu alloys exhibit unacceptably low polishing rates or poor polishing results. Conventional CMP slurries for Cu and Cu alloys contain abrasive particles, such as alumina or silica, an oxidizer, such as hydrogen peroxide or an acid, a complexing agent and an inhibitor, such as benzotriazole. EPO 864 742 A2, discloses a CMP slurry for Cu and Cu alloys containing a urea hydrogen peroxide oxidizer, a complexing agent, such as ammonium oxalate or tartaric acid, an abrasive, a film forming agent, e.g., benzotriazole, and an optional surfactant. The conventional CMP operates by oxidizing the surface of the metal which is then abraded by the abrasive particles. In EPO 846 742 A2, the complexing agent disturbs the passivation layer during mechanical abrasion and forms a complex with the oxidized metal thereby limiting the depth of oxidation.

Conventional oxidizers are small organic molecules, such as hydrogen peroxide, ferric nitrate, potassium iodate and ammonium persulfate. The oxidizers tend to form a thin oxide film to stop further etching once an oxide film is formed. However, the use of small oxidizing molecules tends to diffuse to the metal/oxide interface, or simply diffuses through the less dense oxide film due to their small size and affinity for the metal surface. Such overetching of metal lines results in dishing which may form capillary forces to suck the aqueous solution thereby exacerbating dishing. Currently, dishing is a significant problem in CMP of metal layers, particularly Cu and Cu alloys.

There exists a need for a CMP slurry and methodology for planarizing metals with reduced dishing. There exists a particular need for a CMP slurry for planarizing Cu and Cu metal alloy layers with reduce dishing, increased surface planarity, increased throughput and reduced manufacturing costs.

DISCLOSURE OF THE INVENTION

An aspect of the present invention is a CMP slurry for planarizing metals, such as Cu and Cu alloys, at high production throughput with no or significantly reduced dishing, improved surface planarity, increased throughput and reduced manufacturing costs.

Additional aspects and other features of the present invention will be set forth in part in the description which follows and in part will become apparent to those having ordinary skill in the art upon examination of the following or may be learned from the practice of the present invention. The aspects of the present invention may be realized and obtained as particularly pointed out in the appended claims.

According to the present invention, the foregoing and other aspects are implemented in part by a slurry for chemical-mechanical polishing a metal, the slurry comprising a reagent having: a first moiety for oxidizing the metal and for complexing with the metal and/or metal oxide; and a second moiety for minimizing overetching the metal.

Another aspect of the present invention is a method of planarizing a surface of a metal by chemical-mechanical polishing employing a slurry comprising a reagent having: a first moiety for oxidizing the metal and for complexing with the metal and/or metal oxide; and a second moiety for minimizing overetching the metal.

Embodiments of the present invention comprise CMP Cu or a Cu alloy employing a slurry containing an oxidizing moiety and a complexing moiety, wherein the reduced form of the oxidizing moiety comprises a complexing agent for the metal. Embodiments of the present invention include reagents which are peroxy acids, such as peroxybenzoic acid, chloroperoxybenzoic acid, peroxyacetic acid, and peroxyformic acid. Embodiments of the present invention further include polyethylene glycol peroxy acids.

A further aspect of the present invention is a slurry for chemical mechanical polishing and metal, the slurry consisting essentially of: an amine-peroxy acid; abrasive particles; an inhibitor and deionized water.

Another aspect of the present invention is a method of planarizing a surface of a metal by chemical mechanical polishing employing a slurry consisting essentially of an amine-peroxy acid; abrasive particles; an inhibitor; and deionized water.

Embodiments include employing urea hydrogen peroxide as the amine-peroxy acid which advantageously dissociates in water into an oxidizing agent and complexing agent, thereby avoiding the necessity of providing a separate complexing agent and enhancing the shelf life of the oxidizing component.

Additional aspects of the present invention will become readily apparent to those skilled in this art from the following detailed description, wherein embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

The present invention achieves the heretofore elusive objective of effectively planarizing metals, such as Cu and Cu alloys, at high production throughput while eliminating or substantially reducing dishing, consistent with the ever increasing demands for reliable interconnect patterns having feature sizes in the deep submicron range. In addition, the present invention enables effective CMP of metals at a reduced manufacturing cost. As used throughout this disclosure, the symbol Cu is intended to encompass high purity elemental copper as well as copper-based alloys, e.g., copper-based alloys containing at least about 80 wt. % copper.

The objectives of the present invention are achieved by employing a strategically formulated slurry for CMP metals, such as Cu, with or without abrasive particles. In other words, the slurry of the present invention can be employed with fixed abrasive polishing systems. In accordance with embodiments of the present invention, a reagent is incorporated in the slurry which functions not only as an oxidizer but also complexes with the oxidized metal thereby preventing overetching and enhancing the removal rate by solubilizing the oxidized metal. Embodiments of the present invention, therefore, comprise an organic reagent which contains an oxidizing moiety and a moiety which prevents overetching of the metal. Typically, the oxidizing moiety is a hydrophilic head with a peroxide group and the tail is a hydrophobic tail.

The precise mechanism underpinning the manner on which the reagents of the present invention function is not known with certainty. However, it is believed that the reagents employed in the present invention function both as an oxidizer and, upon oxidation, generate a complexing agent. For example, it is believed that the peroxide hydrophilic head of the inventive reagent oxidizes the metal surface. The resulting by-product, e.g., an organic acid, is believed to react with Cu or the oxidized Cu ($Cu^{++}$) to form a carboxylic acid complex. It is believed that the dishing is significantly curtailed because the reagent molecule stops at the surface of the metal due to the hydrophobic tail. In this way, the thickness of the oxide layer is controlled and dishing reduced.

The present invention offers additional advantages vis-à-vis conventional CMP slurries in that the single compound oxidizing and dishing reducing reagent exhibits greater stability than hydrogen peroxide-containing formulations which exhibit a limited pot life. Moreover, the use of a single compound oxidizing-complexing reagent reduces the number of chemicals involved, as by avoiding a separate complexing agent, thereby simplifying processing and reducing material costs.

Various reagents can be employed or formulated to implement the oxidizing and complexing functions for use in a CMP slurry in accordance with embodiments of the present invention. For example, the oxidizing moiety can comprise a peroxide group, e.g., a peroxycarboxylic acid group or a peroxycarboxylate group, in which case the resulting complexing agent comprises a carboxylic acid or carboxylate. The complexing moiety can comprise an alkyl group or derivative thereof, such as a polyethylene glycol, or an aryl group, such as benzene or a derivative thereof. Thus, suitable reagents include peroxy acids such as peroxybenzoic acid, chlorobenzoic acid, peroxyacetic acid and peroxyformic acid. In addition, suitable reagents include polyethylene glycol peroxy acids, such as $HOOOC(CH_2CH_2O)_n COOOH$, wherein n is about 15, and can be synthesized from polyethylene glycol.

Given the present disclosure and objectives, suitable amounts of reagents and additional components can be determined and optimized in a given situation. Generally, the present invention is applicable for CMP of various metals, such as aluminum, Cu, titanium, tantalum, nitrides thereof, as well as silicon oxynitride. CMP slurries in accordance with embodiments of the present invention can typically contain about 0.005 wt. % to about 25 wt. % of the reagent, such as about 0.5 to about 5 wt. %, e.g., about 0.5 to about 2.5 wt. %. Advantageously, an inhibitor, such as 5-methyl benzotriazole or benzotriazole, can be present as in an amount of about 0.005 wt. % about 0.5 wt. %, e.g., about 0.001 to about 0.1 wt. %. Slurries employed in the present invention can contain abrasive particles, such as alumina or silica, in an amount of about 0.01 to about 30 wt. %.

In another embodiment of the present invention, a base, such as ammonium hydroxide or potassium hydroxide, is introduced to increase the solubility of a reagent if necessary, as when employing a higher molecular weight aliphatic or aromatic carboxylic acid component, e.g. wherein the carboxylic acid component of the reagent contains more than about 7 carbon atoms. The amount of the base is adjusted such that it is present in a sufficient amount to form a salt of the reagent. For example, the base can be present in a molar ratio with respect to the reagent of about 1:1 to about 1:2.

Additional conventional slurry additives can be incorporated into the slurry embodiments of the present invention to achieve their known effect, e.g., to further improve or enhance the polishing rate of a barrier layer in the wafer, such as titanium, tantalum, and nitrides thereof. In embodiments of the present invention wherein an abrasive is employed, such an abrasive can include alumina, titania, zirconia, germania, silica, ceria and mixtures thereof.

In another aspect of the present invention, a reagent is employed that dissociates upon formulating the slurry into an oxidizer and a complexing agent, thereby advantageously reducing the number of separate chemicals required for formulating the slurry and, additionally, increasing the shelf life of the oxidizing component. Suitable reagents for dissociating into an oxidizer and a complexing agent in accordance with the embodiments of the present invention include any of various amine-peroxy acids, such as urea hydrogen peroxide. Thus, the use of a slurry containing such a reagent creates reaction chemistry in situ for metal CMP.

The amine-peroxy acid component, e.g., urea hydrogen peroxide, can be present in an amount of about 0.005 to about 25 wt. %, such as 0.5 to about 5 wt. %, e.g., about 0.5 to about 2.5 wt. %. Advantageously, a separate complexing agent can be excluded from the slurry. Thus, slurries in accordance with the embodiments of the present invention comprise an agent that dissociates into an oxidizing agent and a complexing agent and need only contain abrasive particles, as in an amount up to 30 wt. %, in situations where fixed abrasive elements are not employed, and an inhibitor, such as 5-methyl benzotriazole or benzotriazole, as in an amount of about 0.005 to about 0.5 wt. %, e.g., about 0.001 to about 0.1 wt. %.

In accordance with embodiments of the present invention, a Cu metal film is effectively planarized with no or substantially reduced dishing, thereby enabling the use of conventional photolitography to form metal features having dimensions in the deep submicron range. A typical Cu metallization or interconnect system comprises, but is not limited to, interconnects formed by damascene and comprises depositing an interlayer dielectric overlying a substrate, forming an opening, e.g., a damascene opening, in the interlayer dielectric, depositing a diffusion barrier, such as a TaN or Ta, and filling the opening with Cu. Advantageously, the opening in the interlayer dielectric can be filled by initially depositing a seedlayer and then electroplating or electroless plating the Cu layer, typically at a thickness of about 8,000 to about 18,000 Å. The damascene openings can also be filled with Cu by PVD at a temperature of about 50° C. to about 150° C. or by CVD at a temperature under about 200° C.

Conventional substrates and interdielectric layers are encompassed by the present invention. For example, the substrate can be doped moncrystalline silicon or galliumarsenide. The interlayer dielectric can comprise any of various dielectric materials conventionally employed in the manufacture of semiconductor devices. For example, dielectric materials, such as silicon dioxide, phosphorus-doped silicon glass (PSG), boron-phosphorus-doped silicon glass (BPSG) and silicon dioxide derived from tetraethyl orthosilicate (TEOS) or silane by plasma enhanced chemical vapor deposition (PECVD) can be employed. Interlayer dielectrics in accordance with the present invention can also comprise low dielectric constant materials, including polymers, such as polymides, and carbon-containing silicon dioxide, e.g., Black Diamond® available from Applied Materials Inc., located in Santa Clara, Calif. The openings are formed in interlayer dielectrics by conventional photolithographic and etching techniques.

The present invention provides a CMP slurry for planarizing metals, such as Cu at a high removal rate, e.g., greater than 5,000 Å per minute with reduced dishing, thereby enabling an improvement in the speed of the resulting integrated circuit and yield. Embodiments of the present invention, therefore, enable manufacturing semiconductor devices having enhanced cross-sectional area of copper interconnects, thereby improving electrical performance by reducing interconnect resistance. The slurries of the present invention exhibit high selectivity of Cu to silicon dioxide, thereby rendering them particularly applicable to damascene techniques. The slurries of the present invention enable a reduction in the amount of chemicals employed in a slurry, thereby reducing manufacturing costs and simplifying processing. The slurries in accordance with embodiments of the present invention exhibit significantly greater stability than hydrogen peroxide-containing slurries which have a limited shelf life.

The present invention is applicable to planarizing during various stages of semiconductor manufacturing. The present invention enjoys particular applicability in the manufacture of high density semiconductor devices with metal features in the deep submicron range.

Only the preferred embodiment of the present invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A slurry for chemical mechanical polishing a metal, the slurry consisting essentially of:
    a reagent comprising:
        a first moiety for oxidizing the metal and for complexing with the metal and/or oxidized metal, the first moiety comprising a peroxide group selected from the group of a peroxycarboxylic acid group, a peroxycarboxylate group, or combinations thereof, the first moiety producing a complexing agent comprising a carboxylic acid or a carboxylate following an oxidation reaction; and
        a second moiety for minimizing overetching the metal;
    an inhibitor;
    abrasive particles; and
    deionized water.

2. The slurry according to claim 1, wherein the first moiety is a hydrophilic moiety and the second moiety is a hydrophobic moiety.

3. The slurry according to claim 1, wherein the second moiety comprises an alkyl group, an alkyl group derivative, an aryl group, an aryl group derivative, or combinations thereof.

4. The slurry according to claim 3, wherein the second moiety comprises a polyethylene glycol.

5. The slurry according to claim 4, wherein the polyethylene glycol comprises about 15 repeating monomer units.

6. The slurry according to claim 3, wherein the second moiety comprises benzene or a derivative thereof.

7. The slurry according to claim 1, wherein the metal is copper or a copper alloy.

8. The slurry according to claim 1, further comprising a base.

9. The slurry according to claim 8, wherein the base comprises sodium hydroxide or potassium hydroxide in a molar ratio to the reagent of about 1:1 to about 1:2.

10. The slurry according to claim 8, wherein the base provides a pH of about neutral.

11. The slurry according to claim 1, wherein the reagent comprises from about 0.005 wt. % to about 25 wt. % of the slurry.

12. The slurry according to claim 1, wherein the inhibitor is benzotriazole in an amount of about 0.005 wt. % to about 0.5 wt. %.

13. The slurry according to claim 12, wherein the slurry comprises from about 0.5 to about 5 wt. % of the reagent and about 0.001 to about 0.1 wt. % of benzotriazole.

14. The slurry according to claim 1, consisting of:
    an amine-peroxy acid;
    abrasive particles;
    an inhibitor; and
    deionized water.

15. The slurry according to claim 14, wherein the amine-peroxy acid is a urea hydrogen peroxide.

16. The slurry according to claim 1, wherein the reagent comprises from about 0.005 wt. % to about 25 wt. % of the slurry.

17. The slurry according to claim 1, further comprising an inhibitor.

18. The slurry according to claim 17, wherein the inhibitor is benzotriazole in an amount of about 0.005 wt. % to about 0.5 wt. %.

19. The slurry according to claim 18, wherein the slurry comprises from about 0.5 to about 5 wt. % of the reagent and about 0.001 to about 0.1 wt. % of benzotriazole.

20. A method of planarizing a surface of a metal layer, the method comprising chemical mechanical polishing the surface with a slurry consisting essentially of:
    a reagent comprising:
        a first moiety for oxidizing the metal and for complexing with the metal and/or oxidized metal, the first moiety comprising a peroxide group selected from the group of a peroxycarboxylic acid group, a peroxycarboxylate group, or combinations thereof, the first moiety producing a complexing agent comprising a carboxylic acid or a carboxylate following an oxidation reaction; and
        a second moiety for minimizing overetching of the metal;
    an inhibitor;
    abrasive particles; and
    deionized water.

21. The method according to claim 20, wherein the second moiety comprises an alkyl group, an alkyl group derivative, an aryl group, an aryl group derivative, or combinations thereof.

22. The method according to claim 21, wherein the second moiety comprises a polyethylene glycol.

23. The method according to claim 22, wherein the polyethylene glycol comprises about 15 repeating units.

24. The method according to claim 21, wherein the second moiety comprises benzene or a derivative thereof.

25. The method according to claim 20, wherein the metal is copper or a copper alloy.

26. The method according to claim 20, further comprising a base.

27. The method according to claim 26, wherein the base is sodium hydroxide or potassium hydroxide and is present in a molar ratio with respect to the reagent of about 1:1 to about 1:2.

28. The method according to claim 26, wherein the base provides a pH of about neutral.

29. The method according to claim 20, wherein the reagent is present in an amount of about 0.005 wt. % to about 25 wt. % of the slurry.

30. The method according to claim 20, wherein the inhibitor is benzotriazole and is present in an amount of about 0.005 wt. % to about 0.5 wt. %.

31. The method according to claim 30, wherein the slurry contains about 0.5 to about 5 wt. % of the reagent and about 0.001 to about 0.1 wt. % of the inhibitor.

32. The method according to claim 20, wherein the slurry comprises up to about 30 wt. % of abrasive particles.

33. A slurry for chemical mechanical polishing a metal, the slurry comprising a reagent having:
 a first moiety for oxidizing the metal and for complexing with the metal and/or oxidized metal; and
 a second moiety for minimizing overetching the metal, the second moiety comprising a polyethylene glycol.

34. The slurry according to claim 33, wherein the first moiety is a hydrophilic moiety and the second moiety is a hydrophobic moiety.

35. The slurry according to claim 33, wherein the first moiety is reduced to a complexing agent for the metal or oxidized metal.

36. The slurry according to claim 33, wherein the first moiety comprises a peroxide group selected from the group of a peroxycarboxylic acid group, a peroxycarboxylate group, or combinations thereof, and the resulting complexing agent comprises a carboxylic acid or a carboxylate.

37. The slurry according to claim 33, wherein the second moiety comprises an aryl derivative of the polyethylene glycol.

38. The slurry according to claim 37, wherein the aryl derivative of the polyethylene glycol comprises benzene or a derivative thereof.

39. The slurry according to claim 33, wherein the polyethylene glycol comprises about 15 repeating monomer units.

40. The slurry according to claim 33, wherein the metal is copper or a copper alloy.

41. The slurry according to claim 33, further comprising a base.

42. The slurry according to claim 41, wherein the base comprises sodium hydroxide or potassium hydroxide in a molar ratio to the reagent of about 1:1 to about 1:2.

43. The slurry of claim 41, wherein the base provides a pH of about neutral.

44. The slurry according to claim 33, further comprising abrasive particles up to about 30 wt. % of the solution.

* * * * *